(12) United States Patent
Jain

(10) Patent No.: US 12,732,568 B2
(45) **Date of Patent: *Sep. 8, 2026**

(54) APPLYING MACHINE LEARNING TO HANDLING INTERACTIONS BETWEEN COMPUTING SYSTEMS

(71) Applicant: Truist Bank, Charlotte, NC (US)

(72) Inventor: Nishank Jain, Atlanta, GA (US)

(73) Assignee: Truist Bank, Charlotte, NC (US)

( * ) Notice: Subject to any disclaimer, the term of this patent is extended or adjusted under 35 U.S.C. 154(b) by 58 days.

This patent is subject to a terminal disclaimer.

(21) Appl. No.: 18/624,477

(22) Filed: Apr. 2, 2024

(65) Prior Publication Data

US 2025/0306961 A1 Oct. 2, 2025

(51) Int. Cl.
*H04L 67/50* (2022.01)
*G06F 9/451* (2018.01)
(Continued)

(52) U.S. Cl.
CPC ............ *H04L 67/535* (2022.05); *G06F 9/451* (2018.02); *G06F 18/2415* (2023.01); *H04L 67/306* (2013.01); *H04L 67/53* (2022.05)

(58) Field of Classification Search
CPC ...... G06F 9/451; G06F 18/2415; G06F 40/30; G06F 16/24578; G06N 20/00; G06Q 30/0201; G06Q 10/0633; G06Q 40/02; G06Q 30/0255; G06Q 30/0224; G06Q 20/22; G06Q 30/0269
(Continued)

(56) References Cited

U.S. PATENT DOCUMENTS

2023/0196492 A1* 6/2023 Braud .................... G06Q 50/40 705/7.25
2024/0013263 A1* 1/2024 Gupta ................. G06F 11/3438
(Continued)

OTHER PUBLICATIONS

A. Sajeevan and J. M. P, "A Survey On Location Recommendation Based On PSI Model &Trajectory Mining," 2019 2nd International Conference on Intelligent Computing, Instrumentation and Control Technologies (ICICICT), Kannur, India, 2019, pp. 279-288, (Year: 2019).*
(Continued)

*Primary Examiner* — Taylor A Elfervig
(74) *Attorney, Agent, or Firm* — Kilpatrick Townsend & Stockton LLP; Michael A. Springs, Esq.

(57) ABSTRACT

A system can input a set of usage data associated with an account into a machine-learning model. The set of usage data can include historical data for the account associated with interactions between computing systems. The machine-learning model can generate an output indicating a score for a pattern of behavior associated with the interactions. The system can generate, based on historical data of interactions performed by multiple accounts, an adjustment to an interaction for the account. The adjustment can be used to increase the score for the pattern of behavior. The system can provide a user interface displaying the adjustment. The system can receive, through the user interface, a selection to initiate the adjustment to perform the interaction. In response, the system can automatically configure the system to fulfil the interaction according to the adjustment.

20 Claims, 3 Drawing Sheets

(51) Int. Cl.
*G06F 18/2415* (2023.01)
*H04L 67/306* (2022.01)
*H04L 67/53* (2022.01)

(58) Field of Classification Search
USPC .......................................................... 713/100
See application file for complete search history.

(56) References Cited

U.S. PATENT DOCUMENTS

2025/0029079 A1* 1/2025 Teitel ................... G06Q 20/102
2025/0173730 A1* 5/2025 Thiemann .............. G06Q 20/02

OTHER PUBLICATIONS

R. Khan and R. Hasan, "Fuzzy Authentication Using Interaction Provenance in Service Oriented Computing," 2015 IEEE International Conference on Services Computing, New York, NY, USA, 2015, pp. 170-177 (Year: 2015).*

Teso, Stefano, Öznur Alkan, Wolfgang Stammer, and Elizabeth Daly. "Leveraging explanations in interactive machine learning: An overview." Frontiers in Artificial Intelligence 6 (2023), p. 1-24 (Year: 2023).*

* cited by examiner

APPLYING MACHINE LEARNING TO HANDLING INTERACTIONS BETWEEN COMPUTING SYSTEMS

TECHNICAL FIELD

The present disclosure relates generally to handling interactions between computing systems. More specifically, but not by way of limitation, this disclosure relates to applying machine learning to handling interactions between computing systems.

BACKGROUND

A computing system can be formed from a physical infrastructure containing a hardware router and other network hardware. The network hardware can be configured for routing requests through a network. The requests can include any requests transmitted from one or more sources via one or more networks, such as a local area network or the Internet. End users may have accounts with the computing system. The end users may interact with the computing system to monitor or perform functions using their accounts.

DETAILED DESCRIPTION

Figure 1:
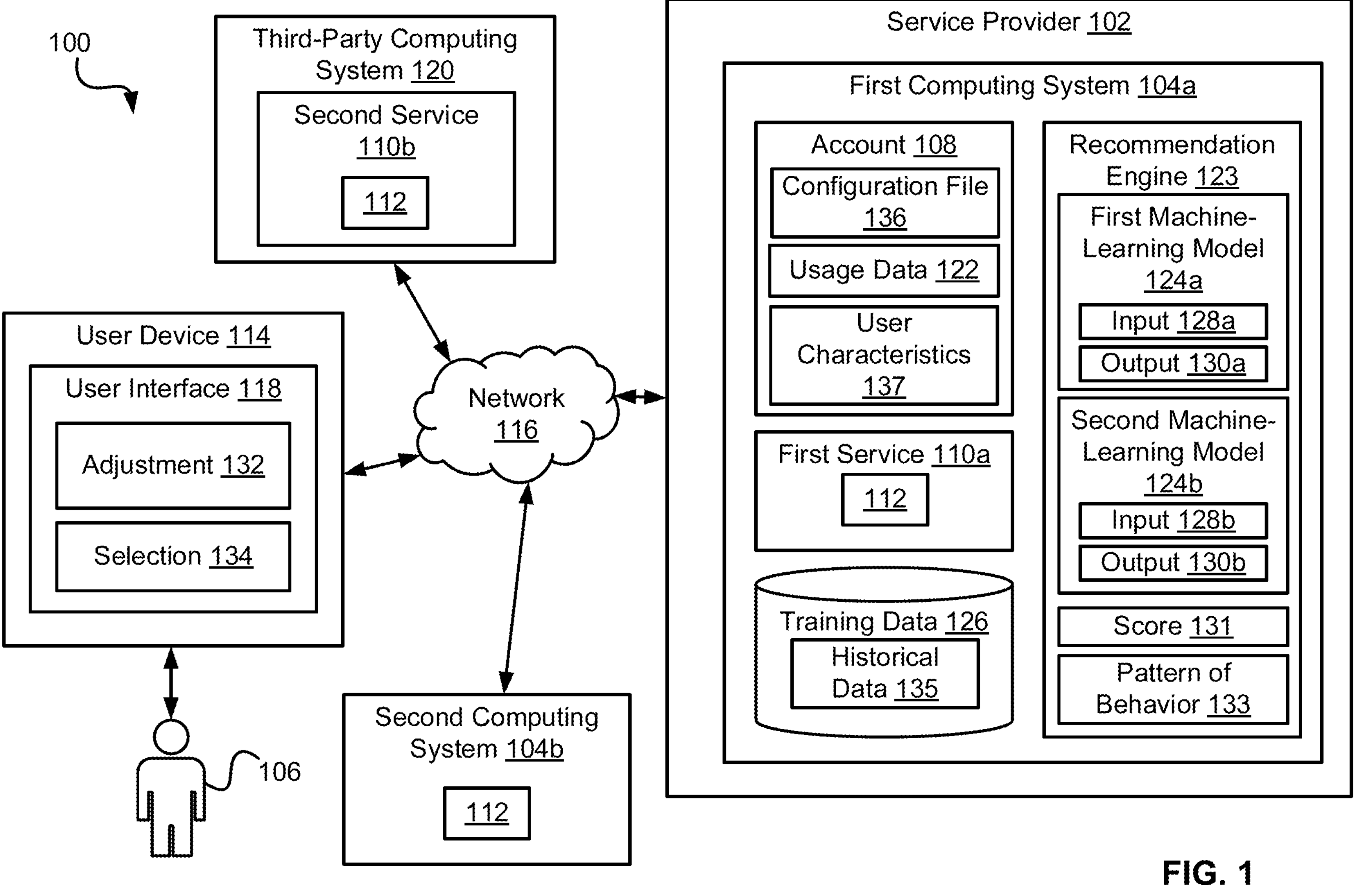
FIG. 1 is a block diagram of an example of a system for applying machine learning to handling interactions between computing systems, according to some aspects of the present disclosure.

Certain aspects and features of the present disclosure relate to using machine learning to generate adjustments for handling interactions between computing systems. A first computing system can perform interactions associated with an account of a user, where the account can be hosted by the first computing system. The interaction can be between the first computing system and a second computing system, which may be separate from the first computing system, such as an interaction involving a movement of resources from the account with the first computing system to another account with the second computing system. The interactions may be initiated by a user and the first computing system can collect usage data associated with the interactions for the account. This usage data can be used to generate one or more adjustments for the user with respect to their account interactions. Through a graphical user interface, the user can approve the adjustments and the first computing system can be automatically configured to perform interactions according to the adjustments.

The first computing system may generate adjustments for handling interactions for the user based on output from one or more machine-learning models. Examples of the machine-learning models can include a neural network, a Naive Bayes classifier, or a support vector machine. In some examples, a first machine-learning model can be trained with historical data to identify patterns of behavior in account interactions. The first machine-learning model may also be trained with historical data that is scored based on the computing efficiency (e.g., minimizing computing resource consumption for the first computing system performing the interactions), maximizing the amount of resources stored in or associated with the account, minimizing penalties associated with performing interactions, and the like. The first computing system can provide usage data for the user's account into the first machine-learning model, which can generate an output of a pattern of behavior and a score for the user's pattern of behavior based on the usage data collected for the account. It may be beneficial to increase the score for the pattern of behavior. Therefore, the first computing system can determine an adjustment to the pattern of behavior that may be associated with a higher score.

For example, the first computing system may include a second machine-learning model that is trained with the historical data to generate adjustments to patterns of behavior. The historical data may include user characteristics for users initiating the interactions indicated in the historical data. Examples of user characteristics can include demographic information such as age, gender, location, income range, profession, marital status, patterns of behavior in performing interactions, or any other characteristics associated with the users or their associated account interactions. The second machine-learning model may be trained to analyze differences between the pattern of the behavior of the user and historical patterns of behavior (e.g., of historical users with one or more user characteristics in common with the user) with higher scores (e.g., scores that are higher than the score for the user's pattern of behavior) to generate an adjustment for the pattern of behavior. In particular, the pattern of behavior, score, and user characteristics for the user can be provided as input to the second machine-learning model, which can generate an output indicating the adjustment. Implementing the adjustment may increase the user's score for the pattern of behavior, thus improving computational efficiency and resource management for the user and the first computing system.

For example, the first machine-learning model may produce an output indicating that the user may have a pattern of initiating a movement of resources from the account to another account with another computing system once per week. The movement of resources may be performed by a first service executed by the first computing system. The output may also indicate a score for this pattern of behavior that is relatively low (e.g., below a target threshold). To improve the score, the output from the first machine-learning model can be provided as input to the second machine-learning model, along with user characteristics for the user. The second machine-learning model can use the input to identify historical data associated with a set of historical users with similar characteristics to the user (e.g., similar income, age, location) that also perform automatic interactions once per week and have higher associated scores for such a pattern of behavior. The second machine-learning model can compare characteristics of the patterns of behavior by the set of historical users to the pattern of behavior by the user to generate an adjustment. For example, historical patterns of behavior that perform the automatic movement of resources once per week with a second service instead of a first service may be associated with higher scores. This may be because the second service can move the resources faster or more efficiently (e.g., with reduced latency) than the first service. Thus, the second machine-learning model can generate an adjustment for the user to perform an automatic movement of resources once per week with the second service. If the user approves this adjustment, the first computing system may automatically set up an interaction of an automatic movement of resources once per week from the account using the second service, such as by generating a set of rules for the account. These adjustments may be tailored to the user based on their own usage data and may provide the user with increased understanding of services executed by the first computing system. The adjustments may also provide insights for optimizing efficiency for both the user and the first computing system.

These illustrative examples are given to provide the reader with the general subject matter discussed here and are not intended to limit the scope of the disclosed concepts. The following sections describe various additional features and examples with reference to the drawings in which like numerals indicate like elements.

FIG. 1 is a block diagram of an example of a system 100 for applying machine learning to handling interactions 112 between computing systems 104*a-b*, according to some aspects of the present disclosure. The system 100 includes a service provider 102 that can operate a first computing system 104*a*. In some examples, the first computing system 104*a* may be a distributed computing system, such as a cloud computing system or a computing cluster, formed from one or more nodes (e.g., physical or virtual servers) that are in communication with one another via a network. The first computing system 104*a* can be formed from a physical infrastructure that includes various network hardware, such as routers, hubs, bridges, switches, and firewalls. The physical infrastructure can also include one or more servers through which a user 106 can perform account functions related to an account 108. The servers may provide backend support for a mobile application or may provide a web interface for enabling the user 106 to perform the account functions. In some examples, the servers may be part of, or otherwise interface with, a first service 110*a* configured to effectuate the account functions.

A user may establish an account 108 with the service provider 102 for use in performing various functions. The account 108 may be of any suitable type. The process of establishing the account 108 may require the user 106 to fill out forms for security purposes. After establishing the account 108 with the service provider 102, the user 106 may use the account 108 to perform various functions. These functions can involve interactions between the first computing system 104*a* and another computing system, such as second computing system 104*b*. For example, the user 106 may use the account 108 to perform an interaction 112 between the first computing system 104*a* and the second computing system 104*b* to obtain access to various resources, such as physical objects or virtual objects. Examples of the physical objects can include food, clothing, and electronics. Examples of the virtual objects can include software, videos, and music files. The interaction 112 may involve transmitting resources from the account 108. The user 106 may use the account 108 to perform one-time interactions or may set up repeated automatic interactions for the account 108 (e.g., interactions that are periodically performed at a particular time without being initiated by the user, such as a housing-related interaction that is transmitted on the first day of each month).

The user 106 may also provide resources to the account 108 over time. For example, the user 106 may input resources into the account 108 at periodic intervals. Alternatively, an entity that is distinct from but associated with the user 106 may provide resources to the account 108. Usage of the account 108 may result in inflows to and outflows from the account 108. The user 106 can set up the account 108 and otherwise interact with the first computing system 104*a* via a user device 114. Examples of the user device 114 can include a mobile phone, a laptop computer, a desktop computer, or a smart watch. The user device 114 can interact with the first computing system 104*a* via a network 116, such as a local area network or the Internet.

The service provider 102 can provide a user interface 118 (e.g., a graphical user interface) to the user 106 for controlling the account 108. The user 106 can access the user interface 118 by logging into the account 108. This may involve the user 106 authenticating with the first computing system 104*a*. For example, the user 106 can provide a username and password associated with the account 108 to the first computing system 104*a*. Upon authenticating the username and password, the first computing system 104*a* may allow the user 106 to access the user interface 118. In some examples, the user interface 118 may be part of an application (e.g., a native application) executing on the user device 114. In other examples, the user interface 118 may be part of a website accessible via a website browser. The user interface 118 may allow the user 106 to perform account functions related to the account 108 hosted by the service provider 102.

For example, the user 106 may interact with the user interface 118 to initiate an interaction 112 that is performed by a first service 110*a* hosted by the service provider 102. The first service 110*a* may be a wire service, and the interaction 112 may involve wiring resources from the account 108 to the second computing system 104*b*. The user 106 may interact with the user interface 118 to initiate interactions that are performed by other services as well. For example, the service provider 102 may coordinate with a second service 110*b* provided by a third-party computing system 120 to fulfill the interaction 112. The second service 110*b* can perform real-time interactions between the account 108 and the second computing system 104*b*. The first computing system 104*a* may route a request for the interaction 112 to the third-party computing system 120 to cause the second service 110*b* to fulfill the interaction 112.

The first computing system 104*a* may generate and store usage data 122 related to the account 108. The usage data 122 can include historical data describing prior usage of the account 108, such as prior interactions or other account functions initiated by the user 106. The usage data 122 may also include user characteristics 137 of the user (e.g., age, profession, marital status, location, income, and the like) and any other user activity behavior associated with the user 106 or the account 108. In some examples, the usage data 122 associated with the account 108 may be stored in various locations, as each service that executes functions associated with the account 108 may separately store usage data for that service. The first computing system 104*a* may compile the usage data 122 for the account 108 by accessing data from the services 110*a-b*, such as by executing application programming interface calls.

In some examples, the first computing system 104*a* may execute a recommendation engine 123 that includes trained machine-learning models 124*a-b*. The recommendation engine 123 can generate adjustments 132 for the user 106 with respect to the account 108 based on outputs from the machine-learning models 124*a-b*. Examples of the trained machine-learning models 124*a-b* may include a neural network or classifier. The trained machine-learning models 124*a-b* may go through a training process to tune weights therein prior to being deployed for use. The training process may include supervised training or unsupervised training, depending on the type of model used and the training data that is available. In some examples, the first computing system 104*a* may use training data 126 in the training process that includes usage histories for different accounts. In some examples, each of the trained machine-learning models 124*a-b* may include one or more machine-learning models. For example, a first machine-learning model 124*a* may include a model that is trained to identify or categorize patterns of behavior 133 or types of users from usage data 122. The first machine-learning model 124*a* may also include a model that is trained to generate a score 131 for the identified pattern of behavior. The first machine-learning model 124*a* can be trained to generate the score 131 based on training data 126 that includes scores assigned to historical data 135. A relatively higher score may indicate a pattern of behavior that is more computationally efficient (e.g., reduces latency or resource consumption for the service provider 102).

The recommendation engine 123 can provide the usage data 122 for the account 108 as a first input 128*a* to the first machine-learning model 124*a*. The first machine-learning model 124*a* can generate a first output 130*a* indicating a pattern of behavior 133 identified for interactions with the account 108 based on the input 128 and a score 131 for the pattern of behavior 133. In some examples, the pattern of behavior 133 may involve an automatic interaction that the user 106 has set up to be automatically performed on a repeating basis (e.g., without requiring user initiation for each subsequent automatic interaction). If the score 131 is relatively low (e.g., below a threshold value), the recommendation engine 123 may automatically generate an adjustment 132 to the pattern of behavior 133 that may result in an increased score.

For example, the first machine-learning model 124*a* may have generated a first output 130*a* identifying a pattern of behavior 133 of an automatic interaction 112 between the first computing system 104*a* and the second computing system 104*b* that involves moving resources from the account 108 to another account associated with the second computing system 104*b*. The automatic interaction 112 may occur on the first day of each month via the first service 110*a*, which may be a wire service. This pattern of behavior 133 may be identified by the first machine-learning model 124*a* in the first output 130*a* as having a relatively low score 131. To improve the score 131, the recommendation engine 123 may provide the pattern of behavior 133, score 131, and user characteristics 137 as a second input 128*b* into a second machine-learning model 124*b*. The second machine-learning model 124*b* can compare the pattern of behavior 133 for the user 106 with historical data 135 for other users (e.g., the training data 126).

For example, the second machine-learning model 124*b* may identify a set of users that historically performed automatic interactions that involved the same entities or similar amounts of resources. In some examples, the set of users may also be identified based on similarities to the user 106. For example, the set of users may include users with one or more user characteristics 137 in common with the user 106 (e.g., age, income, location, etc.). From this set of users, the second machine-learning model 124*b* can determine differences in patterns of behavior that may be associated with higher scores. For example, automatic interactions performed with the second service 110*b* may be associated with higher scores than automatic interactions performed with the first service 110*a*. The second service 110*b* may be a real-time service that can execute the interaction faster compared to the first service 110*a*. Additionally, causing the second service 110*b* to execute the automatic interaction 112 instead of the first service 110*a* may be more computationally efficient for the first computing system 104*a*. This can reduce latency for the first computing system 104*a*.

Therefore, the second machine-learning model 124*b* can generate a second output 130*b* based on the second input 128*b* indicating an adjustment 132 for the user 106 to use the second service 110*b*. The recommendation engine 123 can output the adjustment 132 to the user via the user interface 118.

In another example, when the user 106 sets up an automatic interaction 112, the first computing system 104*a* may adjust a configuration file 136 for the account 108 that can dictate how the automatic interaction 112 is to be performed. For example, the configuration file 136 may dictate the size or amount of resources that are to be moved from the account 108, the repeating date on which the resources are to be moved (e.g., the first day of each month), and the service that is to execute the automatic interaction 112. This pattern of behavior 133 can be identified by the first machine-learning model 124*a* as having a relatively low score 131. The pattern of behavior 133 and the score 131 can be provided as second input 128*b* into the second machine-learning model 124*b*, which may determine, such as by analyzing the training data 126, that automatic interactions that are performed on different days of the month are associated with higher scores. This may be because a majority of users perform housing-related interactions on the first day of the month, resulting in high network traffic and resource strain for the service provider 102. Performing a housing-related interaction on another day of the month may result in a lower score. Therefore, the second machine-learning model 124*b* may generate a second output 130*b* indicating an adjustment 132 to the automatic date. The adjustment 132 may involve executing the automatic interaction 112 on the fifteenth day of each month instead of the first day of each month.

The first computing system 104*a* can transmit the adjustment 132 to the user 106 to request the user 106 to approve or deny the adjustment 132. The first computing system 104*a* can provide the adjustment 132 to the user 106 as part of the user interface 118. If the user 106 makes a selection 134 via the user interface 118 to approve the adjustment 132, the first computing system 104*a* can be automatically configured to apply the adjustment 132. For example, if the adjustment 132 involves switching from the first service 110*a* to the second service 110*b*, the first computing system 104*a* can update the configuration file 136 associated with executing the automatic interaction 112. The updated configuration file 136 can dictate that subsequent automatic interactions 112 will be fulfilled by automatically routing the interaction 112 to the third-party computing system 120 to cause the second service 110*b* to execute the automatic interaction 112. If the adjustment 132 involves changing a repeating date for the automatic interaction 112, the first computing system 104*a* can update the configuration file 136 to dictate that the automatic interaction 112 is to be executed on the recommended date on a repeating basis.

Although FIG. 1 depicts a certain number and arrangement of components, this is for illustrative purposes and is intended to be non-limiting. Other examples may include more components, fewer components, different components, or a different arrangement of the components shown in FIG. 1. For example, although FIG. 1 involves routing requests using two different services, other examples may involve a larger number of services or computing systems and more complex routing schemes.

Figure 2:
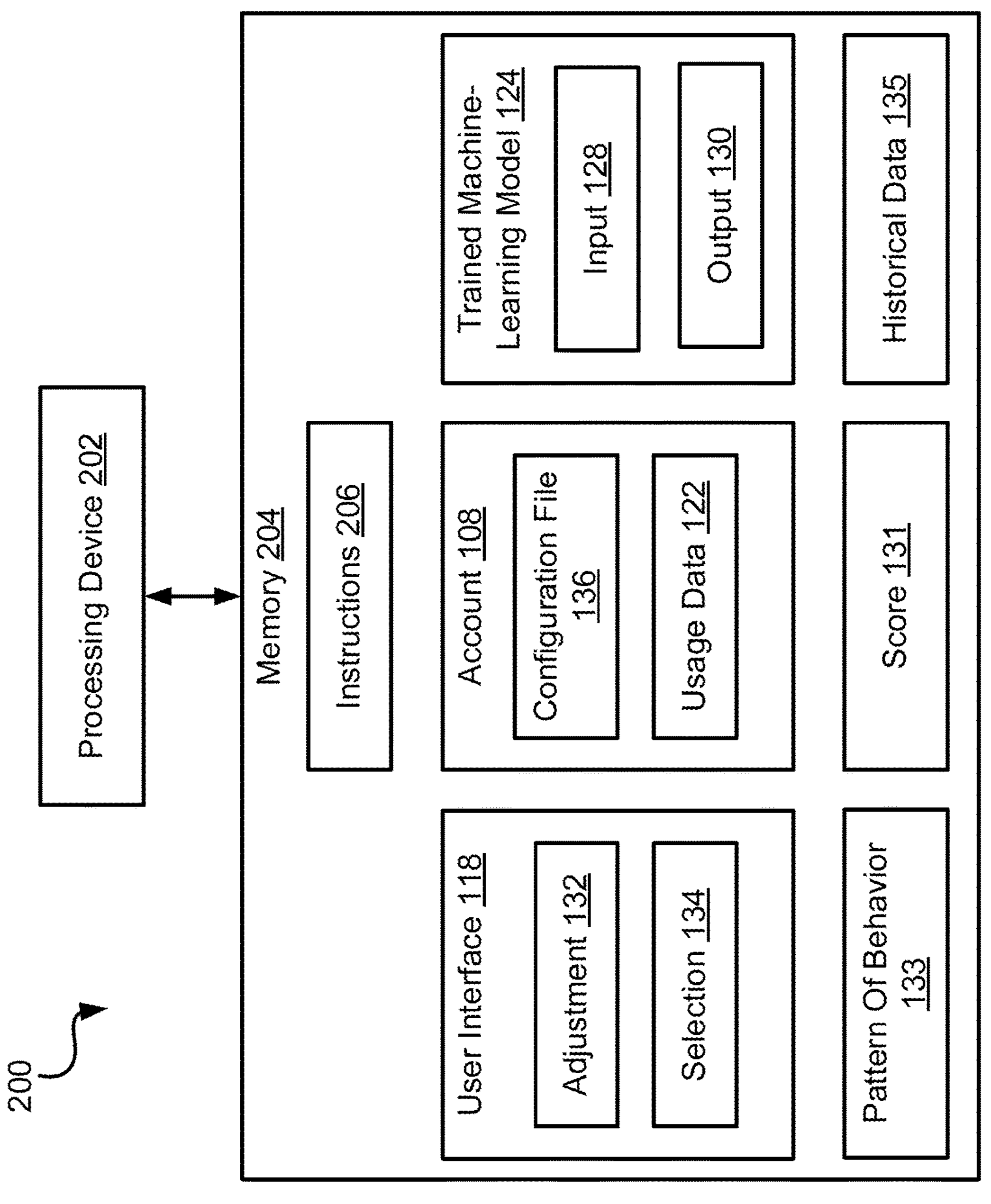
FIG. 2 is a block diagram of another example of a system for applying machine learning to handling interactions between computing systems, according to some aspects of the present disclosure.

FIG. 2 is a block diagram of another example of a system for applying machine learning to handling interactions between computing systems, according to some aspects of the present disclosure. The system 200 includes a processing device 202 that is communicatively coupled to a memory 204. In some examples, the processing device 202 and the memory 204 may be distributed from (e.g., remote to) one another.

The processing device 202 can include one processing device or multiple processing devices. Non-limiting examples of the processing device 202 include a Field-Programmable Gate Array (FPGA), an application-specific integrated circuit (ASIC), a microprocessor, etc. The processing device 202 can execute instructions 206 stored in the memory 204 to perform operations. In some examples, the instructions 206 can include processor-specific instructions generated by a compiler or an interpreter from code written in a suitable computer-programming language, such as C, C++, C#, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. At least some of the memory 204 can include a non-transitory, computer-readable medium from which the processing device 202 can read instructions 206. A computer-readable medium can include electronic, optical, magnetic, or other storage devices capable of providing the processing device 202 with computer-readable instructions or other program codes. Non-limiting examples of a computer-readable medium include magnetic disk(s), memory chip(s), ROM, random-access memory (RAM), an ASIC, a configured processor, optical storage, or any other medium from which a computer processor can read the instructions 206.

The system 200 may also include other input and output (I/O) components, which are not shown here for simplicity. Examples of such input components can include a mouse, a keyboard, a trackball, a touch pad, and a touch-screen display. Examples of such output components can include a visual display, an audio display, and a haptic display. Examples of a visual display can include a liquid crystal display (LCD), a light-emitting diode (LED) display, and a touch-screen display. An example of an audio display can include speakers. An example of a haptic display may include a piezoelectric vibration device or an eccentric rotating mass (ERM) device.

The memory 204 can include one or more trained machine-learning models 124 (e.g., the first machine-learning model 124*a* and the second machine-learning model 124*b*) configured to analyze interactions 112 between computing systems. The one or more trained machine-learning models 124 can generate an output 130 indicating a score 131 for a pattern of behavior 133 identified from usage data 122 collected for an account 108 associated with a user. The memory 204 may include instructions 206 that can be executed by the processing device 202 to generate an adjustment 132 to an interaction associated with the account 108 based on historical data 135. The adjustment 132 may increase the score 131 for the pattern of behavior 133. The memory 204 can also include a user interface 118 that can display the adjustment 132 to a user 106. A selection 134 approving the adjustment 132 can be received via the user interface 118. In response, the processing device 202 can configure the system 200 to fulfill the interaction 112 according to the adjustment 132.

Figure 3:
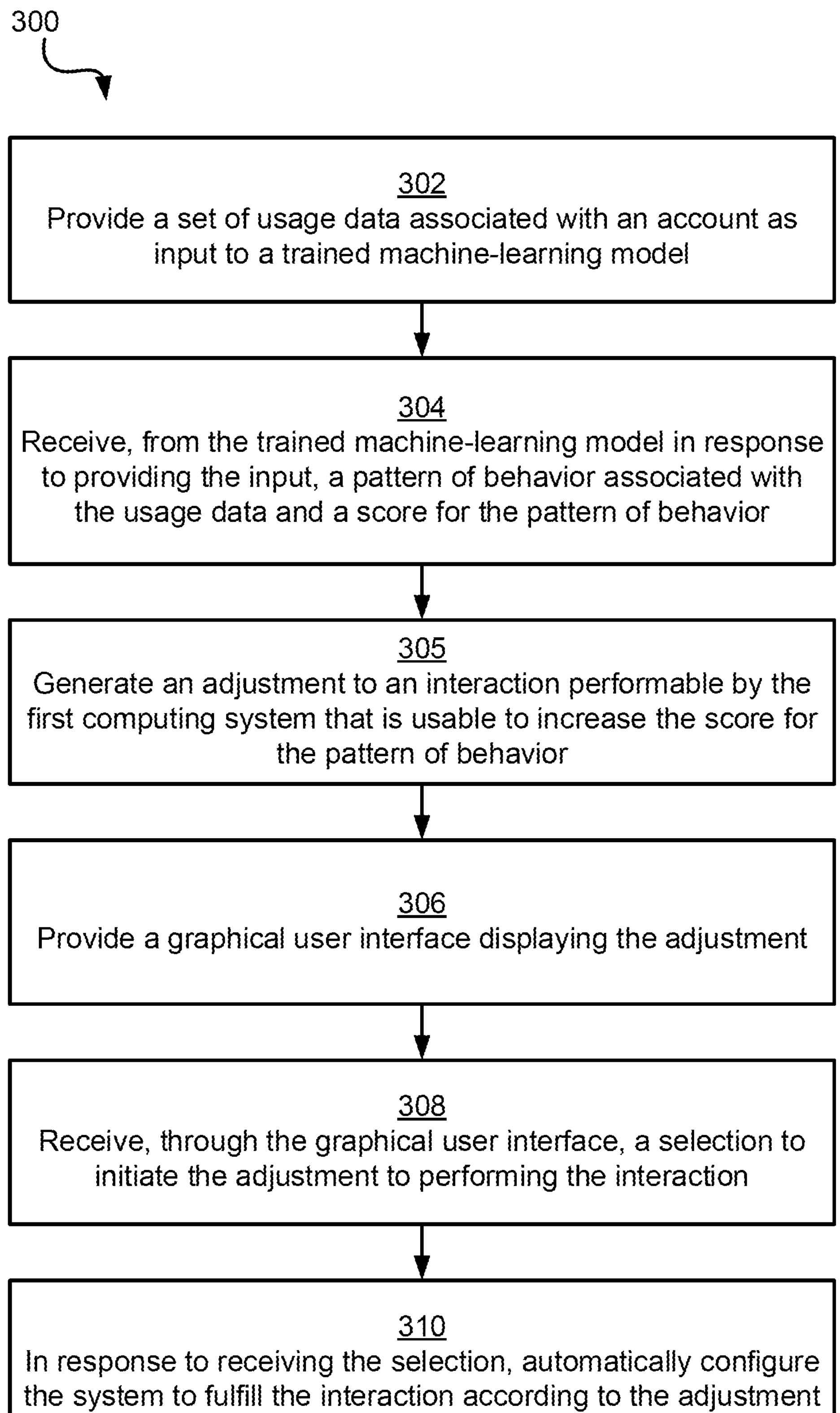
FIG. 3 is a flow chart of an example of applying machine learning to handling interactions between computing systems, according to some aspects of the present disclosure.

Turning now to FIG. 3, shown is a flow chart of an example of a process 300 for applying machine learning to handling interactions between computing systems, according to some aspects of the present disclosure. Other examples can include more operations, fewer operations, different operations, or a different order of operations shown in the figures. The operations of FIG. 3 will now be described below with reference to the components described above in FIGS. 1-2. Some or all of the steps of the process 300 can be performed by the processing device 202.

At block 302, the processing device 202 can provide a set of usage data 122 associated with an account 108 of a user 106 as input 128 to a first machine-learning model 124*a*. The set of usage data 122 can include historical data associated with interactions between a first computing system 104*a* associated with the account 108 and a second computing system 104*b*. The first machine-learning model 124*a* may be trained based on a set of training data 126 that includes usage data for multiple accounts. The training data 125 may include scores for patterns of behavior of historical usage data. The first machine-learning model 124*a* can be configured to generate a first output 130*a* identifying a pattern of behavior 133 from the usage data 122. The first machine-learning model 124*a* can also generate a first output 130*a* of a score 131 for the pattern of behavior 133. The score 131 may indicate a resource strain involved in performing the interactions associated with the pattern of behavior 133. In some examples, the first machine-learning model 124*a* may output multiple patterns of behavior and associated scores. The processing device 202 may identify one or more of the patterns of behavior as having a score that is below a target threshold. Adjustments can therefore be generated for such patterns of behavior. For example, the first machine-learning model 124*a* may generate first output 130*a* indicating that the user 106 has a pattern of making multiple resource retrievals from the account 108 per month via the first service 110*a* and an associated score 131 that is below the target threshold.

At block 304, the processing device 202 can receive, from the first machine-learning model 124*a* in response to providing the first input 128*a*, the pattern of behavior 133 and the score 131. The pattern of behavior 133 and the score 131 can be indicated in the first output 130*a*.

At block 305, the processing device 202 can generate an adjustment 132 to an interaction 112 performed by the first computing system. Applying the adjustment 132 may increase the score 131 for the pattern of behavior 133. The processing device 202 can generate the adjustment 132 based on historical data 135 of usage data from multiple users and their associated interactions. The processing device 202 can identify, from the historical data, users with similar patterns of behavior but higher scores (e.g., higher than the score 131 for the pattern of behavior 133 identified from the usage data 122). In some examples, the second machine-learning model 124*b* can be executed to identify the patterns of behavior with higher scores in the historical data 135. The processing device 202 can compare the higher-scoring patterns of behavior to the user's pattern of behavior 133 to generate the adjustment 132. In some examples, the adjustment 132 may be determined using a second machine-learning model 124*b*.

For example, the processing device 202 may provide the output 130 from the first machine-learning model 124*a* as second input 128*b* to the second machine-learning model 124*b*. The second machine-learning model 124*b* may determine from the historical data 135 that interactions involving a single resource retrieval over a month are associated with lower scores than interactions that involve multiple, smaller resource retrievals over the month. The second machine-learning model 124*b* can generate a second output 130*b* based on the second input 128*b* that indicates an adjustment 132 that may involve performing a single interaction 112 via the first service 110*a* per month. The single interaction 112 may combine the multiple resource retrievals into a single resource retrieval. Executing a single interaction 112 may consume less computing resources than performing multiple individual interactions. To confirm that such an adjustment 132 may be beneficial, the processing device 202 can input the adjustment 132 with the usage data 122 into the trained machine-learning model 124. The trained machine-learning model 124 can output a second score for the adjustment 132, and if the second score is higher than the first score determined solely from the usage data 122, the processing device 202 may output the adjustment 132 to the user 106.

At block 306, the processing device 202 can provide a graphical user interface 118 displaying the adjustment 132 to the user 106. The graphical user interface 118 can be output to a user device 114. The adjustment 132 can be displayed as part of an application or a webpage associated with the service provider 102. For example, the graphical user interface 118 may provide an option for the user 106 to set up an automatic repeating interaction of a single resource retrieval once per month for an amount that covers the amount of resources previously retrieved by the user 106 over a period of a month.

At block 308, the processing device 202 can receive, through the graphical user interface 118, a selection 134 from the user 106 to initiate the adjustment 132 to perform the interaction 112. The user 106 may select the option to set up the automatic interaction of a single resource retrieval. The user device 114 can transmit the selection 134 to the processing device 202.

At block 310, the processing device 202 can automatically configure the first computing system 104*a* to fulfill the interaction 112 according to the adjustment 132 in response to receiving the selection 134 from the user 106. For example, the processing device 202 can configure the first computing system 104*a* to automatically execute the single interaction 112 using the first service 110*a* at a repeating time (e.g., once a month). Setting up this repeating, single, and automatic interaction 112 can allow the user 106 to forgo manually initiating multiple individual interactions.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

What is claimed is:

1. A system comprising:

a processor; and a memory including instructions that are executable by the processor for causing the processor to:

provide a set of usage data associated with an account as input to a trained machine-learning model, the set of usage data including first historical data associated with first interactions between a first computing system associated with the account and a second computing system, the trained machine-learning model being configured to generate an output comprising (i) a pattern of behavior identified from the set of usage data and (ii) a score for the pattern of behavior, the pattern of behavior comprises the first computing system executing the first interactions via a first service;

receive, from the trained machine-learning model in response to providing the input, the output;

generate, based at least in part on the output and second historical data comprising second interactions associated with a plurality of accounts, an adjustment to an interaction performable by the first computing system, the adjustment to the interaction being usable to increase the score for the pattern of behavior, wherein the adjustment comprises adjusting the interaction to be routed to a second service to execute the interaction, and wherein the second service is different from the first service and is executed by a third-party computing system;

provide a graphical user interface displaying the adjustment;

receive, through the graphical user interface, a selection to initiate the adjustment to perform the interaction; and in response to receiving the selection, automatically configure the first computing system to fulfill the interaction according to the adjustment by updating a configuration file for the account such that the interaction is automatically routed to the third-party computing system to be executed by the second service.

2. The system of claim 1, wherein the first service is a wire service, and wherein the second service is a real-time service.

3. The system of claim 1, wherein the configuration file is a first configuration file, wherein the pattern of behavior further comprises an automatic interaction that is repeated, wherein the account comprises a second configuration file dictating that the automatic interaction is executed on a first repeating date, wherein the adjustment comprises executing the automatic interaction on a second repeating date that is different than the first repeating date, and wherein the memory further includes instructions that are executable by the processor for causing the processor to automatically configure the first computing system to execute the automatic interaction by:

adjusting the second configuration file for the account to cause the automatic interaction to be executed on the second repeating date.

4. The system of claim 1, wherein the first historical data further relates to the first interactions being executed by a particular service, wherein the adjustment comprises performing a single interaction with the particular service that combines the first interactions, and wherein the memory further includes instructions that are executable by the processor for causing the processor to automatically configure the first computing system to fulfill the interaction by:

configuring the particular service to automatically execute the single interaction at a particular repeating time.

5. The system of claim 1, wherein the trained machine-learning model is a first machine-learning model, the input is a first input, and the output is a first output, and wherein the memory further includes instructions that are executable by the processor for causing the processor to generate the adjustment by:

providing the first output from the first machine-learning model as second input to a second machine-learning model, wherein the second machine-learning model is configured to generate the adjustment to the pattern of behavior by comparing the pattern of behavior and the score to the second historical data, the second historical data comprising historical patterns of behavior and historical scores; and receiving a second output from the second machine-learning model indicating the adjustment.

6. The system of claim 1, wherein the set of usage data includes first user characteristics of a user associated with the account, and wherein at least one of the first user characteristics is in common with a second user characteristic indicated by the second historical data associated with the plurality of accounts.

7. The system of claim 1, wherein the score comprises a computational efficiency for the first computing system in executing the interactions.

8. The system of claim 1, wherein the score comprises a resource consumption efficiency score for the first computing system in executing the interactions.

9. The system of claim 1, wherein the score comprises a latency efficiency score for the first computing system in executing the interactions.

10. The system of claim 1, wherein the pattern of behavior consists of an automatic wire transfer interaction, performed by the first computing system via a wire service, executed on a first repeating date of each month, wherein the adjustment consists of (i).

11. A method comprising:

providing, by a processor, a set of usage data associated with an account as input to a trained machine-learning model, the set of usage data including first historical data associated with first interactions between a first computing system associated with the account and a second computing system, the trained machine-learning model being configured to generate an output comprising (i) a pattern of behavior identified from the set of usage data and (ii) a score for the pattern of behavior, the pattern of behavior comprises the first computing system executing the first interactions via a first service;

receiving, by the processor and from the trained machine-learning model in response to providing the input, the output;

generating, by the processor and based at least in part on the output and second historical data comprising a plurality of second interactions associated with a plurality of accounts, an adjustment to an interaction performable by the first computing system, the adjustment to the interaction being usable to increase the score for the pattern of behavior, wherein the adjustment comprises adjusting the interaction to be routed to a second service to execute the interaction, and wherein the second service is different from the first service and is executed by a third-party computing system;

providing, by the processor, a graphical user interface displaying the adjustment;

receiving, by the processor and through the graphical user interface, a selection to initiate the adjustment to perform the interaction; and in response to receiving the selection, automatically configuring, by the processor, the first computing system to fulfill the interaction according to the adjustment by updating a configuration file for the account such that the interaction is automatically routed to the third-party computing system to be executed by the second service.

12. The method of claim 11, wherein the first service is a wire service, and wherein the second service is a real-time service.

13. The method of claim 11, wherein the configuration file is a first configuration file, wherein the pattern of behavior further comprises an automatic interaction that is repeated, wherein the account comprises a second configuration file dictating that the automatic interaction is executed on a first repeating date, wherein the adjustment comprises executing the automatic interaction on a second repeating date that is different than the first repeating date, and wherein the method further comprises automatically configuring the first computing system to execute the automatic interaction by:

adjusting the second configuration file for the account to cause the automatic interaction to be executed on the second repeating date.

14. The method of claim 11, wherein the first historical data further relates to the first interactions being executed by a particular service, wherein the adjustment comprises performing a single interaction with the particular service that combines the first interactions, and wherein the method further comprises automatically configuring the first computing system to fulfill the interaction by:

configuring the particular service to automatically execute the single interaction at a particular repeating time.

15. The method of claim 11, wherein the trained machine-learning model is a first machine-learning model, the input is a first input, and the output is a first output, and wherein generating the adjustment further comprises:

providing the first output from the first machine-learning model as second input to a second machine-learning model, wherein the second machine-learning model is configured to generate the adjustment to the pattern of behavior by comparing the pattern of behavior and the score to the second historical data, the second historical data comprising historical patterns of behavior and historical scores; and receiving a second output from the second machine-learning model indicating the adjustment.

16. The method of claim 11, wherein the set of usage data includes first user characteristics of a user associated with the account, the first user characteristics comprising an age and a location of the user, wherein the second historical data comprises second user characteristics comprising the same age or the same location for second users associated with the plurality of accounts.

17. A non-transitory computer-readable medium comprising program code that is executable by a processor for causing the processor to:

provide a set of usage data associated with an account as input to a trained machine-learning model, the set of usage data including first historical data associated with first interactions between a first computing system associated with the account and a second computing system, the trained machine-learning model being configured to generate an output comprising (i) a pattern of behavior identified from the set of usage data and (ii) a score for the pattern of behavior, the pattern of behavior comprises the first computing system executing the first interactions via a first service;

receive, from the trained machine-learning model in response to providing the input, the output;

generate, based at least in part on the output and second historical data comprising a plurality of second interactions associated with a plurality of accounts, an adjustment to an interaction performable by the first computing system, the adjustment to the interaction being usable to increase the score for the pattern of behavior, wherein the adjustment comprises adjusting the interaction to be routed to a second service to execute the interaction, and wherein the second service is different from the first service and is executed by a third-party computing system;

provide a graphical user interface displaying the adjustment;

receive, through the graphical user interface, a selection to initiate the adjustment to perform the interaction; and in response to receiving the selection, automatically configure the first computing system to fulfill the interaction according to the adjustment by updating a configuration file for the account such that the interaction is automatically routed to the third-party computing system to be executed by the second service.

18. The non-transitory computer-readable medium of claim 17, wherein the first service is a wire service, and wherein the second service is a real-time service.

19. The non-transitory computer-readable medium of claim 17, wherein the interaction is a repeating interaction, wherein the configuration file dictates, prior to generating the adjustment, a first amount of resources to transfer for the repeating interaction, and wherein the adjustment further comprises updating the configuration file to dictate a second amount of resources to transfer for the repeating interaction, the second amount resources being different from the first amount of resources.

20. The non-transitory computer-readable medium of claim 15, wherein, prior to generating the adjustment, the configuration file dictates the interaction to be performed on a first repeating date of a month, and wherein generating the adjustment to the interaction further comprises:

determining, based on the second historical data, a first network traffic associated with the first computing system performing the second interactions on the first repeating date of the month;

determining a second network traffic associated with the first computing system performing second interactions on a second repeating date of the month; and generating, based on a comparison between the first network traffic and the second network traffic, the adjustment comprising updating the configuration file to cause the interaction to be performed on the second repeating date of the month.

* * * * *